Patented July 18, 1950

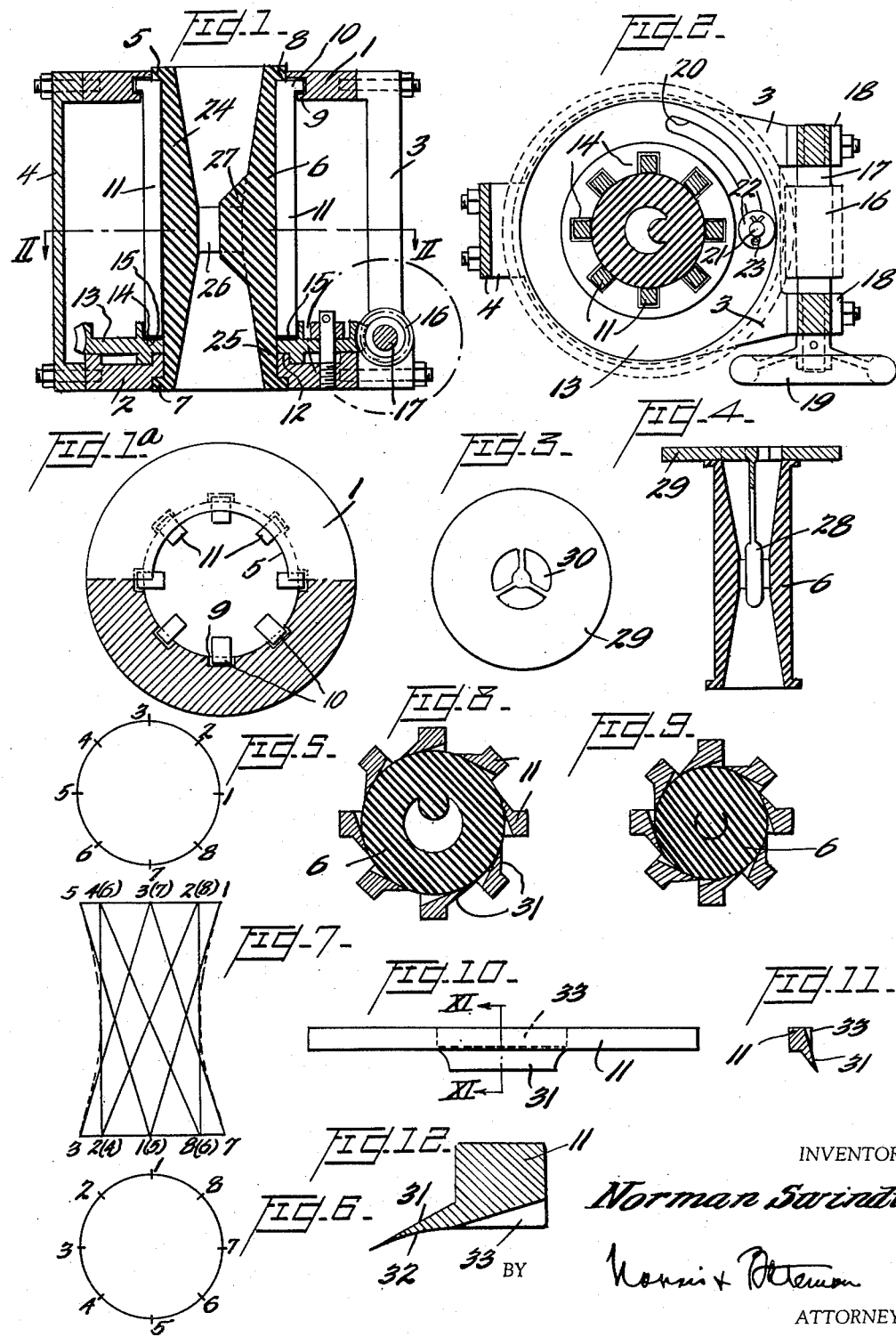

2,516,029

UNITED STATES PATENT OFFICE 2,516,029

VALVE FOR FLUIDS

Norman Swindin, London, England

Application July 23, 1946, Serial No. 685,637
In Great Britain May 3, 1946

14 Claims. (Cl. 251—5)

This invention relates to improvements in valves for fluids and has more particular reference to valves intended for controlling the flow of corrosive materials including dilute or concentrated acids, corrosive gases, or of fluids containing crystalline matter in suspension.

The invention is based upon the observed fact that if a series of straight rods are arranged, preferably at intervals of equal spacing, with their axes at equal radii from a common centre, so as to form a circular cage, and all said rods are held at their upper or lower alike extremities, whilst their other extremities are subjected each to the same angular movement about their radial centre, each said bar becomes displaced about a circumferential path, and the contour of the circular cage changes substantially to that known as a paraboloid of revolution, and appears as though two truncated cones had been disposed one on top of the other with their minor diameters abutting. Thus the paraboloid contour of the assembled rods upon rotation at one end about the axis of assembly has a less diameter at its centre than at either extremity. It follows that if a flexible and resilient conduit be closely housed within said bars, said conduit will suffer distortion at approximately mid-centre in height by twisting in the aforesaid manner the said bars, and its interior cross-sectional area will be lessened until closure results. The ability of the walls of the flexible conduit to close over that portion of its length encaged by the rods is enhanced if the interior of such portion be fashioned to form a Venturi tube, that is to say as two cones that tend to converge at their lesser diameters but are separated by a short cylindrical length having parallel walls.

According to the invention a valve for controlling the flow of fluids is provided wherein a flexible conduit is retained at each end in a housing and is enclosed by a plurality of bars or rods disposed along the wall of said conduit, each of said rods being retained at one end in said housing so as to be movable on said end angularly to its longitudinal axis, and at the other end being mounted in said housing so as to be rotatable about the axis of said conduit, reduction in the area enclosed by said bars, intermediate the ends thereof, resulting from such rotation compressing said flexible conduit and thereby causing constriction or closure of the passage therethrough.

The invention is further characterised by moulding the valve conduit from a suitable resilient material such as rubber, or rubber-like material and fashioning its internal walls as a Venturi tube, and the provision within the throat of said tube of a cylindrical or substantially cylindrical bar, said bar depending from one end of the housing coaxially within said conduit or being moulded non-axially in the wall of said conduit.

Reference will now be made to the accompanying drawings illustrating preferred forms of construction according to the invention and in which:

Fig. 1 is a sectional elevation of the improved valve according to the invention, Fig. 1a is a plan view, partly broken away, of the upper plate of the valve, Fig. 2 is a view on the line II—II of Fig. 1, Fig. 3 is a plan view of a modified form of construction of the valve, Fig. 4 is a sectional elevation of the valve conduit in the form of construction shown in Fig. 3, Fig. 5 is a diagrammatic plan view showing the positions of the bars enclosing the valve conduit before rotation, Fig. 6 is a diagrammatic plan view showing the positions of the bars at one end after rotation through approximately 90° relative to the position in Fig. 5, Fig. 7 is a diagrammatic elevation of the bars in Figs. 5 and 6 showing the formation of the paraboloid of revolution produced by the aforesaid rotation of the bars enclosing the valve conduit, Fig. 8 is a cross section showing a modified form of construction of the bars enclosing the valve conduit in the open position thereof, Fig. 9 is a view, similar to Fig. 8, in the closed position of the valve conduit, Fig. 10 is a side elevation of a bar in the valve construction according to Figs. 8 and 9, Fig. 11 is a section on the line XI—XI of Fig. 10, and Fig. 12 is an enlarged view of Fig. 11.

In a preferred form of construction as shown in Figs. 1 and 2 the valve housing consists of upper and lower circular plates 1 and 2 respectively which may be held apart by a circular shroud or, as shown in the drawings, by frame members 3 and 4. The upper plate 1 has a central aperture 5 to accommodate one end of a flexible conduit 6 the other end of which is accommodated in a central flanged aperture 7 formed in the lower plate 2, the conduit 6 being formed at either end with a peripheral flange 8, adapted to fit into the flanged aperture 7 of the lower plate 2. Within the wall of the aperture 5 in the upper plate 1 there are formed peripheral flanged recesses 9 which accommodate freely and with clearance the flanged ends 10 of a series of rods or bars 11 which may be of rectangular round or other desired section. The recesses 9 and the flanged ends 10 are so formed as to allow free movement of the bars 11 on their flanged ends 10 about the longitudinal axis of the said bars or angularly thereto, without disengagement of said flanged ends from said recesses. The lower plate 2 has an annular boss 12 on its upper surface, the said boss 12 forming a bearing for a worm wheel 13 in the body of which are formed sockets 14 to accommodate the lower extremities 15 of the rods or bars 11. A worm 16 engages said worm wheel 13 and is mounted on a shaft 17 journalled in bearings 18 formed in or applied to the frame members 3 of the valve housing. The shaft 17 is provided at one end with a pulley or a wheel 19 for operation to rotate the worm 16 and wheel 13. The worm wheel 13 is formed with one or more arcuate slots 20 through which pass one or more studs 21 secured within the bottom plate 2. The end of the stud 21 projecting through the arcuate slot 20 is provided with a washer 22 which is held in contact with the worm wheel 13 by means of a split pin 23 or like suitable means.

In the form of construction shown in Fig. 1 the valve conduit 6 is formed as a Venturi tube, that is with two truncated cone portions 24, 25 joined at their narrower diameters by a middle portion 26 having parallel walls. The central portion 26 of the valve conduit 6 is provided with an inwardly projecting bar or ridge 27 formed integral with the wall of said conduit. The valve conduit 6 is preferably moulded from rubber or other suitable resilient rubber-like material.

Alternatively, as shown in Figs. 3 and 4, a bar 28 may be arranged to depend coaxially within the central portion 26 of the conduit 6, the bar being formed integral with a plate 29 provided with apertures 30 for the passage of fluid therethrough and adapted to be secured against one end of the conduit 6. The bar 28 and plate 29 will be formed of similar material to that employed for the valve conduit 6.

It is also possible to make the bar 28 integral with either the upper plate 1 or the lower plate 2, but the other constructions described above will be preferable when dealing with acid or like fluids. In some cases it may be advantageous to omit the bar 28 and use only the conduit construction shown in Fig. 4.

In operation, assuming the valve to be fully open, turning of the wheel 19 rotates the worm 16 and produces rotation of the worm wheel 13 on the boss 12. In this way the ends of the bars 11 held in the recesses 14 of the worm wheel 13 are moved angularly about the axis of the worm wheel and the valve conduit 6, thereby causing each bar to be displaced about a circumferential path whilst pivoting on its flanged end 10 within the recesses 9, angularly to its longitudinal axis. This movement is illustrated diagrammatically in Figs. 5, 6 and 7 in which Fig. 6 shows the angular displacement of the ends of the bars compared with their original position, shown in Fig. 5, after rotation of the worm wheel through approximately 90°. Fig. 7 shows the appearance of the bars after the movement referred to, the dotted lines indicating the paraboloid of revolution which is the approximate contour imparted to the bars. The valve conduit 6 contained within the framework of bars 11 will, as a result of the change in the contour of this framework, undergo constriction which will be greatest at the middle portion 26. Final closure of the passage in the conduit 6 is achieved when the walls of the conduit at or near the middle portion 26 engage or when the said walls engage the outer surface of the dependent bar 28. The use of the dependent bar 28 (Fig. 4) or the bar or ridge 27 (Fig. 1) enables the conduit to be completely closed with a smaller degree of constriction than would be possible if the said bar were omitted, and therefore makes possible the use of a conduit of greater cross sectional area in its middle portion than would otherwise be practicable.

The conduit construction shown in Fig. 1 is preferred where the liquid passing therethrough may contain solids or fibrous material which might be obstructed by the bar 28 shown in Fig. 4.

In some cases, depending on the number of bars employed and the thickness and stiffness of the valve conduit, it may be found that there is a tendency for portions of the wall of the valve conduit to protrude between the bars on operation of the valve to close the passage through the conduit. In order to avoid this occurrence the modified form of construction of the bars as shown in Figs. 8 to 12 is adopted. In this modified form each of the bars 11 is provided at its middle portion with a lateral tongue 31 (Fig. 10), arranged so that in the normal position of the bars 11 the inner surface 32 of the tongue 31 lies tangentially to and in contact with the outer wall of the conduit (Fig. 8). Behind the tongue 31 the bar 11 is formed with a wedge shaped recess 33 in which is accommodated the tongue 31 of an adjacent bar 11 when the bars are in the closed position, as shown in Fig. 9.

In this way, when bars of the modified form of construction, as described above, are employed in a valve according to the invention, the operation of closing the valve in the manner previously described will result in the middle portion of the valve conduit 6 being totally enclosed by metal, that is, by the overlapping bars 11 and lateral tongues 31 (Fig. 9), thus preventing protrusion of the wall of the valve conduit 6 between the bars 11 and a consequent reduction in the efficiency of the valve.

I claim:

1. A valve for controlling the flow of fluids comprising in combination, a housing, a flexible conduit retained at each end in said housing, a plurality of rigid rods spaced circumferentially around said conduit adjacent to the outer wall thereof, each of said rods being pivotally mounted at one end in said housing so as to be movable on said end angularly to the longitudinal axis of said rod, means for mounting the other ends of said rods for rotation about the axis of said conduit, and means on said housing for effecting rotation of said rods at the said other ends thereof, about the axis of said conduit.

2. A valve for controlling the flow of fluids, comprising in combination, a housing, a flexible conduit retained at each end in said housing, the housing having a series of peripheral recesses around the conduit, a plurality of rigid rods spaced circumferentially around said conduit adjacent to the outer wall thereof, each rod having a flange formed at one end thereof, each said flange being retained in one of said series of recesses so as to permit pivotal movement of each said rod, on said end, angularly to the longitudinal axis of said rod, means for mounting the other ends of said rods for rotation about the axis of said conduit, and means on said housing for effecting rotation of said mounting means about the axis of said conduit.

3. A valve for controlling the flow of fluids, comprising in combination, a housing, a flexible conduit retained at each end in said housing, the housing having a series of peripheral recesses around the conduit, an annular series of rigid rods spaced concentrically around and enclosing said conduit adjacent to the outer wall thereof, each of said rods having a flange formed at one end thereof and, pivotally mounted in one of said recesses so as to permit pivotal movement of each said rod, on said end, angularly to the longitudinal axis of said rod; a rotatable member mounted in the other end of said housing and formed with an annular series of recesses adjacent the periphery of said conduit and concentrically thereof, said rods being mounted at their other ends in said recesses in said rotary member; and means on said housing for effecting rotation of said member and said other ends of the rods about the axis of said conduit.

4. A valve for controlling the flow of fluids, comprising in combination, a housing, a flexible conduit retained at each end in said housing, said housing having a series of peripheral recesses around the conduit, an annular series of rigid rods spaced circumferentially around said conduit adjacent to the outer wall thereof, each of said rods being formed with a flange at one end, and retained in one of said recesses of said housing so as to permit pivotal movement of each said rod, on said end, angularly to the longitudinal axes of said rod; a rotatable member mounted in the other end of said housing and formed with an annular series of recesses adjacent the periphery of said conduit and concentrically therewith, said rods being mounted at their other ends in said recesses in said rotatable member; and means on said housing for rotating said rotatable member about the axis of the conduit.

5. A valve for controlling the flow of fluids, comprising in combination, a housing, apertured plates mounted at the respective ends of said housing, a flexible conduit mounted within said housing and retained at the respective ends by said apertured plates, one of said plates being formed with a series of recesses adjacent the periphery of said conduit therein and concentrically therewith, a plurality of rigid rods enclosing said conduit and disposed along and adjacent to the wall thereof; each rod having a flange formed at one end thereof and loosely mounted in one of said recesses in said plate so as to permit pivotal movement of each rod, on said end, angularly to the longitudinal axis of the rod; an apertured worm wheel mounted co-axially around said conduit and formed with a series of recesses into which the respective ends of said rods engage; a worm mounted on said housing and engaging with said worm wheel; and means for rotating said worm.

6. A valve for controlling the flow of liquids, comprising in combination, a housing, apertured plates mounted at the respective ends of said housing, a flexible conduit having its internal passage shaped as a Venturi tube, mounted within said housing and retained at its respective ends by said apertured plates, one of said plates being formed with a series of recesses adjacent the periphery of said conduit therein, a plurality of rigid rods enclosing said conduit and disposed longitudinally along the wall thereof; a flange formed at one end of each rod and loosely engaged in the respective recess in said plate as to permit pivotal movement of each said rod, on said end, angularly to the longitudinal axis of the rod, an apertured worm wheel mounted co-axially around said conduit and formed with a series of recesses into which said rods engage at their other ends; a worm mounted on said housing and engaging with said worm wheel; and means for rotating said worm.

7. A valve for controlling the flow of fluids comprising in combination, a housing, a flexible conduit having the passage therethrough shaped as a Venturi tube and retained at each end in said housing, a plurality of rigid rods enclosing said conduit and disposed longitudinally along the wall thereof, means for retaining each of said rods at one end in said housing so as to be movable pivotally on said end angularly to the longitudinal axis of said rod, means for mounting said rods at their other ends for rotation about the axis of said conduit, and means on said housing for effecting rotation of said rods at the said other ends thereof about the axis of said conduit.

8. A valve for controlling the flow of fluids comprising in combination, a housing, a flexible conduit having the passage therethrough shaped as a Venturi tube and retained at each end in said housing, an inwardly projecting longitudinal ridge moulded integral with the inner wall of said conduit at the middle portion thereof, a plurality of rigid rods enclosing said conduit and disposed longitudinally along the wall thereof, means for retaining each of said rods at one end in said housing so as to be movable pivotally on said end angularly to the longitudinal axis of said rod, means for mounting said rods at their other ends for rotation about the axis of said conduit, and means on said housing for effecting rotation of said rods at the said other ends thereof about the axis of said conduit.

9. A valve for controlling the flow of fluids comprising in combination, a housing, a flexible conduit of rubber-like material retained at each end in said housing, a plurality of rigid rods enclosing said conduit and disposed longitudinally along the wall thereof, means for mounting each of said rods at one end in said housing so as to be movable pivotally on said end angularly to the longitudinal axis of said rod, means for mounting said rods at their other ends for rotation about the axis of said conduit, and means on said housing for effecting rotation of said rods at the said other ends thereof about the axis of said conduit.

10. A valve for controlling the flow of fluids comprising in combination a housing, a flexible conduit having the passage therethrough shaped as a Venturi tube and retained at each end in said housing, a substantially cylindrical bar depending co-axially within the middle portion of said conduit, a plurality of rigid rods enclosing said conduit and disposed longitudinally along the wall thereof, means for retaining each of said rods at one end in said housing so as to be movable pivotally on said end angularly to the longitudinal axis of said rod, means for mounting said rods at their other ends for rotation about the axis of said conduit, and means on said housing for effecting rotation of said rods at the said other ends thereof about the axis of said conduit.

11. A valve for controlling the flow of fluids, comprising in combination, a housing, apertured plates mounted at the respective ends of said housing, a flexible conduit mounted within said housing and retained at each end by said apertured plates, one of said plates being formed with a series of recesses adjacent the periphery of said conduit therein, a plurality of rigid rods enclosing said conduit and disposed longitudinally along the wall thereof; a flange formed at one end of each of said rods, said flanges being so retained respectively in said recesses as to permit pivotal movement of each said rod, on said end, angularly to the longitudinal axis of the rod; an apertured worm wheel mounted co-axially around said conduit and formed with a series of recesses into which respective rods engage at their other ends; a worm mounted on said housing and engaging with said worm wheel; means for rotating said worm, and a stop on said housing for limiting the degree of rotation of said worm wheel.

12. A valve for controlling the flow of fluids comprising in combination, a housing, a flexible conduit retained at each end in said housing, a plurality of rigid rods enclosing said conduit and disposed longitudinally along the wall thereof, means for retaining each of said rods at one end in said housing so as to be movable pivotally, on said end, angularly to the longitudinal axis of said rod, means for mounting said rods at their other ends for rotation about the axis of said conduit, means on said housing for rotating said rods, at the said other ends thereof, about the axis of said conduit, and a laterally extending tongue formed at the middle portion of each said rod, said tongues being arranged in tangential contact with said conduit and each said rod being formed with a corresponding wedge-shaped recess adapted to receive the tongue of an adjacent rod.

13. A valve for controlling the flow of fluids comprising in combination, a housing, a resilient conduit having the passage therethrough shaped as a Venturi tube and retained at each end in said housing, an inwardly projecting longitudinal ridge moulded integral with the inner wall of said conduit at the middle portion thereof, a plurality of rigid rods enclosing said conduit and disposed longitudinally along the wall thereof, means for retaining each of said rods at one end in said housing so as to be movable pivotally, on said end, angularly to the longitudinal axis of said rod, means for mounting said rods at their other ends for rotation about the axis of said conduit, means on said housing for rotating said rods, at the said other ends thereof, about the axis of said conduit, and a laterally extending tongue formed at the middle portion of each said rod, said tongues being arranged in tangential contact with said conduit and each said rod being formed with a corresponding wedge-shaped recess adapted to receive the tongue of an adjacent rod.

14. A valve for controlling the flow of fluids comprising in combination a housing, a resilient conduit, having the passage therethrough shaped as a Venturi tube and retained at each end in said housing, a substantially cylindrical bar smaller than the passage in the conduit and depending co-axially within the middle portion of said conduit, a plurality of rigid rods enclosing said conduit and disposed longitudinally along the wall thereof, means for retaining each of said rods at one end in said housing so as to be movable pivotally, on said end, angularly to the longitudinal axis of said rod, means for mounting said rods at their other ends for rotation about the axis of said conduit, means on said housing for rotating said rods, at the said other ends thereof, about the axis of said conduit, and a laterally extending tongue formed at the middle portion of each said rod, said tongues being wedge-shaped and arranged in tangential contact with said conduit and projecting toward adjacent rods and each said rod being formed with a corresponding wedge-shaped recess adapted to receive the tongue of an adjacent rod.

NORMAN SWINDIN.

REFERENCES CITED

The following references are of record in the file of this patent:

UNITED STATES PATENTS

| Number | Name | Date |
|---|---|---|
| 977,044 | Rebourg | Nov. 29, 1910 |
| 2,313,550 | Huber | Mar. 9, 1943 |

FOREIGN PATENTS

| Number | Country | Date |
|---|---|---|
| 335,675 | Germany | of 1922 |
| 521,820 | Germany | of 1931 |